United States Patent [19]

Takao et al.

[11] Patent Number: 4,786,976

[45] Date of Patent: Nov. 22, 1988

[54] IMAGE PROCESSING APPARATUS

[75] Inventors: Mitsuji Takao, Tokyo; Hiroyuki Mikada, Yokohama, both of Japan

[73] Assignee: Canon Kabushiki Kaisha, Tokyo, Japan

[21] Appl. No.: 580,821

[22] Filed: Feb. 16, 1984

[30] Foreign Application Priority Data

Feb. 25, 1983 [JP] Japan ................................ 58-31177

[51] Int. Cl.[4] .............................................. H04N 1/40
[52] U.S. Cl. ................................... 358/283; 358/298; 382/53
[58] Field of Search ............... 358/280, 283, 282, 298; 353/53, 51

[56] References Cited

U.S. PATENT DOCUMENTS

| 4,208,677 | 6/1980 | Schayes | 358/280 |
| 4,411,015 | 10/1983 | Scherl et al. | 382/51 |
| 4,414,581 | 11/1983 | Kato et al. | 358/280 |
| 4,485,408 | 11/1984 | Kamizyo et al. | 358/283 |
| 4,495,522 | 1/1985 | Matsumawa et al. | 358/283 |
| 4,547,811 | 10/1985 | Ochi et al. | 358/280 |
| 4,723,173 | 2/1988 | Tanioka . | |

FOREIGN PATENT DOCUMENTS 3107521 9/1982 Fed. Rep. of Germany .
3128794 5/1983 Fed. Rep. of Germany .

OTHER PUBLICATIONS

*Copy of Partial Translation of W. Germany Offenlegunsschrift No. 31 07 521 A1.
**Extract from DE-OS No. 31 28 794 A1.

Primary Examiner—Edward L. Coles, Sr.
Attorney, Agent, or Firm—Fitzpatrick, Cella, Harper & Scinto

[57] ABSTRACT

An image processing apparatus comprises a memory for storing image data of each of a plurality of blocks of an input image data, a buffer for delaying the input image data and a processor for processing the image data supplied from the buffer in a processing manner determined by the output of the memory.

29 Claims, 6 Drawing Sheets

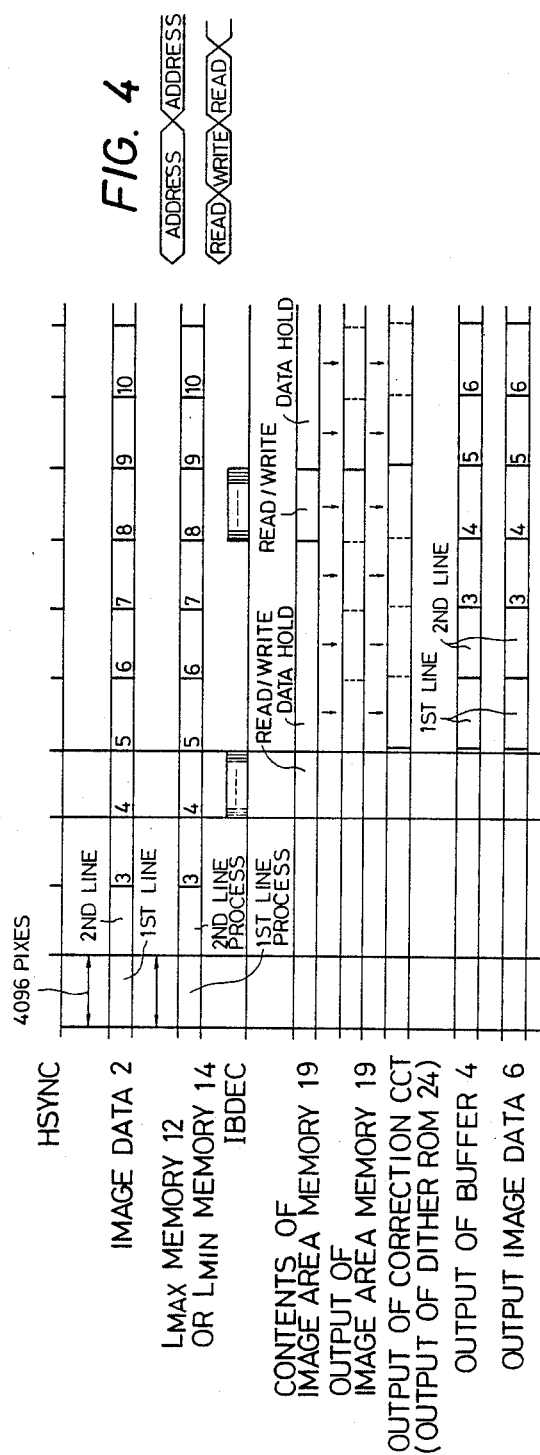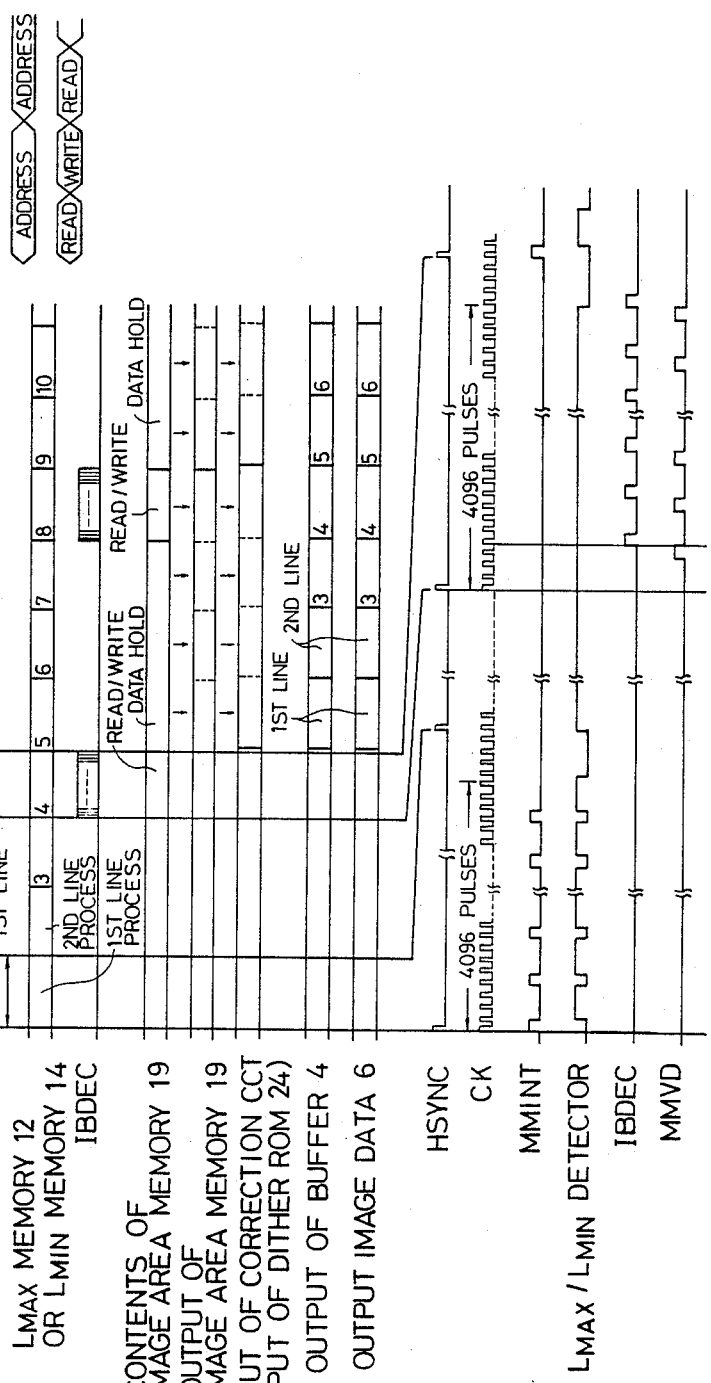

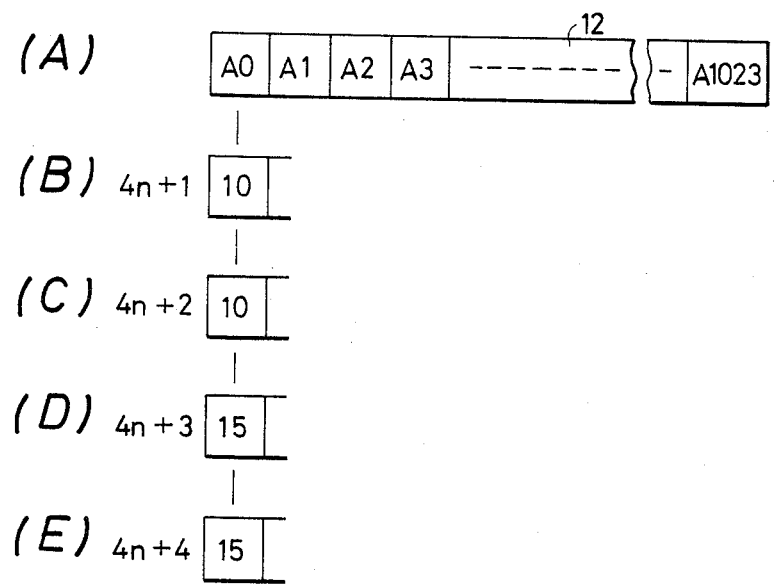

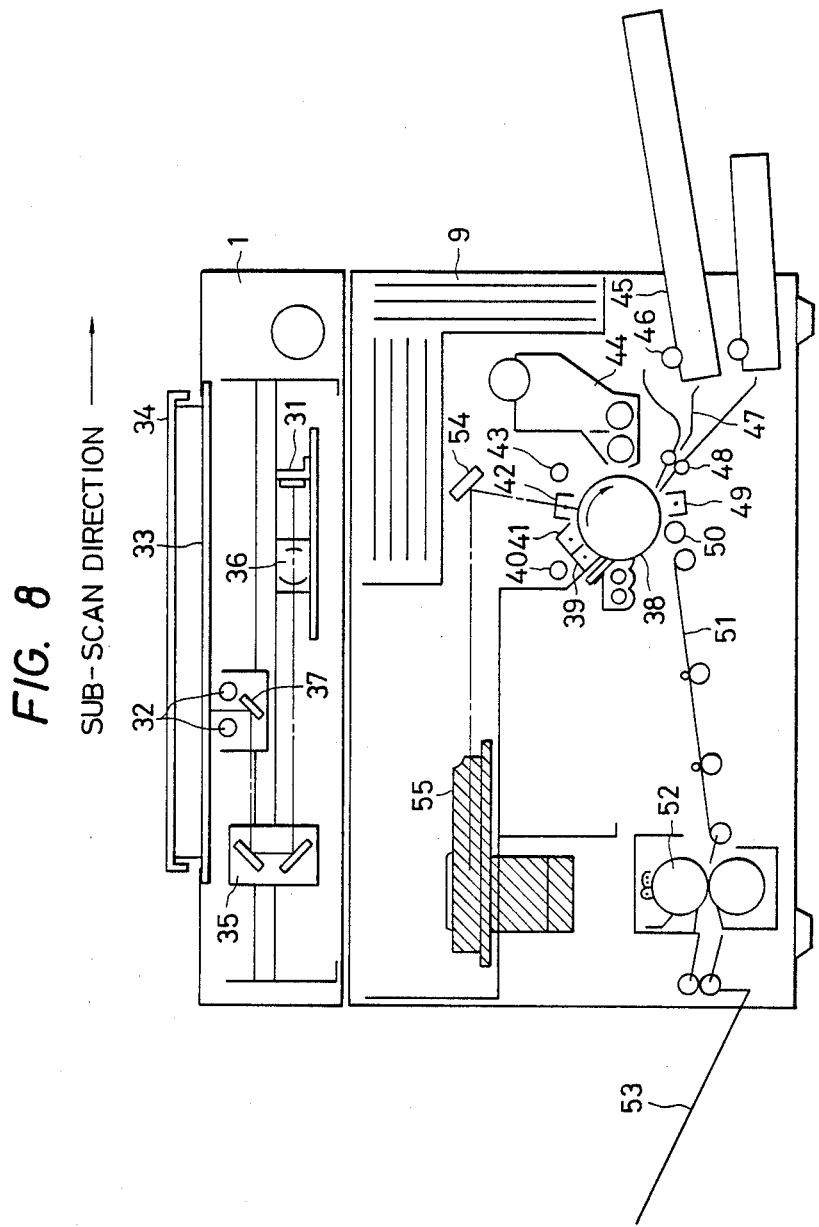

IMAGE PROCESSING APPARATUS

BACKGROUND OF THE INVENTION

1. Field of the Invention

The present invention relates to an image processing apparatus in an electronic file or a digital copying machine, and more particularly to an image processing apparatus capable of separating and discriminating binary image components such as characters and half-tone image components in one image.

2. Description of the Prior Art

In an office equipment for processing an image in an electronic file or a digital copying machine, two competing demands, one for clearly reproducing boundaries of white and black areas such as for a character image and the other for reproducing half-tone areas while deemphasizing the boundaries of the white and black areas, such as for a photographic image have been requested.

The former demand has been met by improving the image resolution power of the equipment and the latter demand has also been substantially met by a systematic dither method recently developed in the digital image processing field.

However, an original document which a user inserts is to the equipment is not always clearly classified as a character image (binary image) or a half-tone image, and in many cases, character images, graphic images and photographic images exist in one original document.

Since it is difficult to discriminate the binary image and the half-tone image in one original document, the images have been processed by either binary recording technique (in which the image data is binarized by a predetermined threshold to record it as on/off dots) or a half-tone recording technique (in which the image data is binarized by a dither matrix to record it as on/off dots). The binary recording technique which clearly reproduces white and black areas is suitable to reproduce a binary image such as a character image or bar graph image and a band compression encoding of a transmitted signal is easy to attain, but it is difficult to reproduce a half-tone image such as a photograph or a picture. On the other hand, the dither method can provide a high quality of image for the half-tone image but has a low resolution power. Therefore, the quality of the image is poor for a binary image such as the character image. Accordingly, when the original document contains both the character image and the half-tone image, it is not possible to reproduce the original image with a high quality by only the dither method.

As an approach to solving the above problem, it may be possible to use the systematic dither method for the half-tone image area in the original document and use the binary processing method for the binary image area, such as the character or pattern image of the same document to obtain a high quality of image reproduction.

However, since this method requires discrimination of the binary image area and the half-tone image area, an image memory which stores pixels read from the original document in one-to-one correspondence is required. As the result, as the size of an image screen, pixel density and the number of gray levels to be processed increase, the capacity of the memory increases and a complex circuit is required. As the result, the cost of the memory increases, the reliability of the overall equipment decreases, and the complexity of the memory operation increases.

SUMMARY OF THE INVENTION

It is an object of the present invention to provide an image processing apparatus which can reproduce, with a high quality, an image of an original document which contains a binary image such as characters and a half-tone image such as a photograph.

It is another object of the present invention to provide a low cost and high speed image processing apparatus.

It is another object of the present invention to provide an image processing apparatus capable of discriminating images with a small capacity of memory.

The other objects of the present invention will be apparent from the following description of the invention made with reference to the accompanying drawings.

BRIEF DESCRIPTION OF THE DRAWINGS

FIG. 3 shows a time chart for the operation of FIG. 2, FIG. 4 shows an operation timing for an image area memory 19, FIG. 6 shows a pixel density of an original document, FIGS. 7a–e show areas of the Lmax memory 12, and FIG. 8 shows sectional views of a reader 1 and a printer 9.

DETAILED DESCRIPTION OF THE PREFERRED EMBODIMENTS

Figure 1:
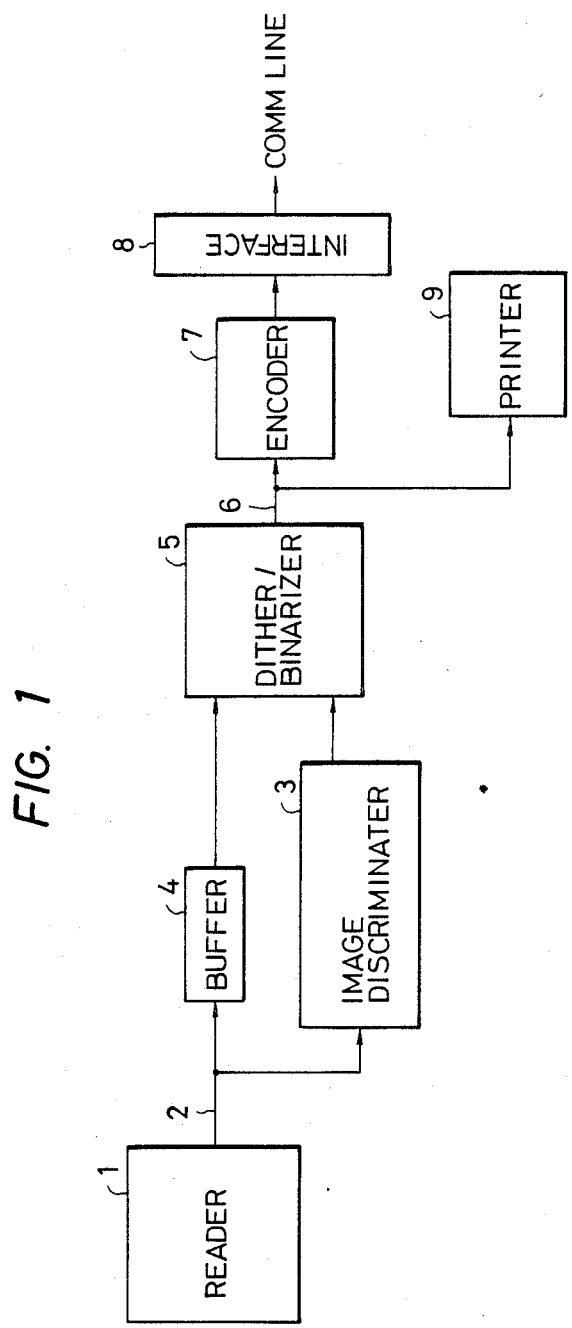
FIG. 1 is a block diagram of one embodiment of an image processing apparatus of the present invention.

FIG. 1 shows a block diagram of one embodiment of the image processing apparatus of the present invention. Numeral 1 denotes a reader for reading an image data from an original document and numeral 2 denotes an image data signal. For example, for a 16-level half-tone image, 4 bits/pixel image data signals are sequentially produced by the reader 1. Numeral 3 denotes an image discriminator which processes the image data signal from the reader 1 to separate it to a binary (non-half-tone) image area and a multi-value (half-tone) image area. Numeral 4 denoted a buffer which delays the image data signal from the reader 1 to synchronize it with the output of the image discriminator 3. Numeral 5 denotes a dither/binarizer which dithers or binarizes the image data delayed by the buffer 4 in accordance with the output of the image discriminator 3. Numeral 6 denotes the output of the dither/binarizer 5 which includes both the dithered image data and the binarized image data. Numeral 7 denotes an encoder (e.g. MH encoder) for encoding the signal 6 and numeral 8 denotes a line interface to a communication line. It may include a memory for storing one document page of encoded as required. Numeral 9 denotes a printer for printing the image of the original document read by the reader 1. It may be a laser beam printer. The output of the encoder 7 may be stored in a disk.

In FIG. 1, the original document is scanned by the reader 1 from left to right (main scan) and from top to bottom (sub-scan) to read pixels in 16 tone levels. Thus, 4-bit image data is obtained for each pixel. (Let us assume that the image data 2 is a 4-bit parallel signal.) The image discriminator 3 divides the image into 4×4-pixel blocks, detects a maximum pixel density Lmax and a minimum pixel density Lmin for each block, calculates a difference (Lmax−Lmin), compares it with an image discrimination parameter P to discriminate the binary image area and the multi-value image area. (That is called an image discrimination processing.) More specifically, each block is discriminated as binary image area when Lmax−Lmin≧P multi-value image area when Lmax−Lmin<P and the result is stored in a memory in the image discriminator 3 ("1" for the binary image area and "0" for the multi-value image area). On the other hand, the image data 2 delayed by the buffer 4 by the time corresponding to the processing time of the image discriminator 3 is binarized by the dither/binarizer if the output of the image discriminator is "1", and dithered if the output is "0". In this manner, each 4×4-pixel block is binarized or ditherd depending on the output of the image discriminator 3.

The image signal 6 thus produced is a sequence of image data binarized or dithered for every four-pixel group in the main scan direction. The image signal 6 is encoded by the encoder 7 and sent out to the communication line through the line interface 8. The printer 9 is used to simultaneously print the image during the transmission or to use the apparatus as a copying machine.

Details of the image discriminator 3, the buffer 4 and the dither/binarizer 5 shwn in FIG. 1 are explained below with reference to FIG. 2, in which numerals above the lines indicate the numbers of bits.

Figure 2:
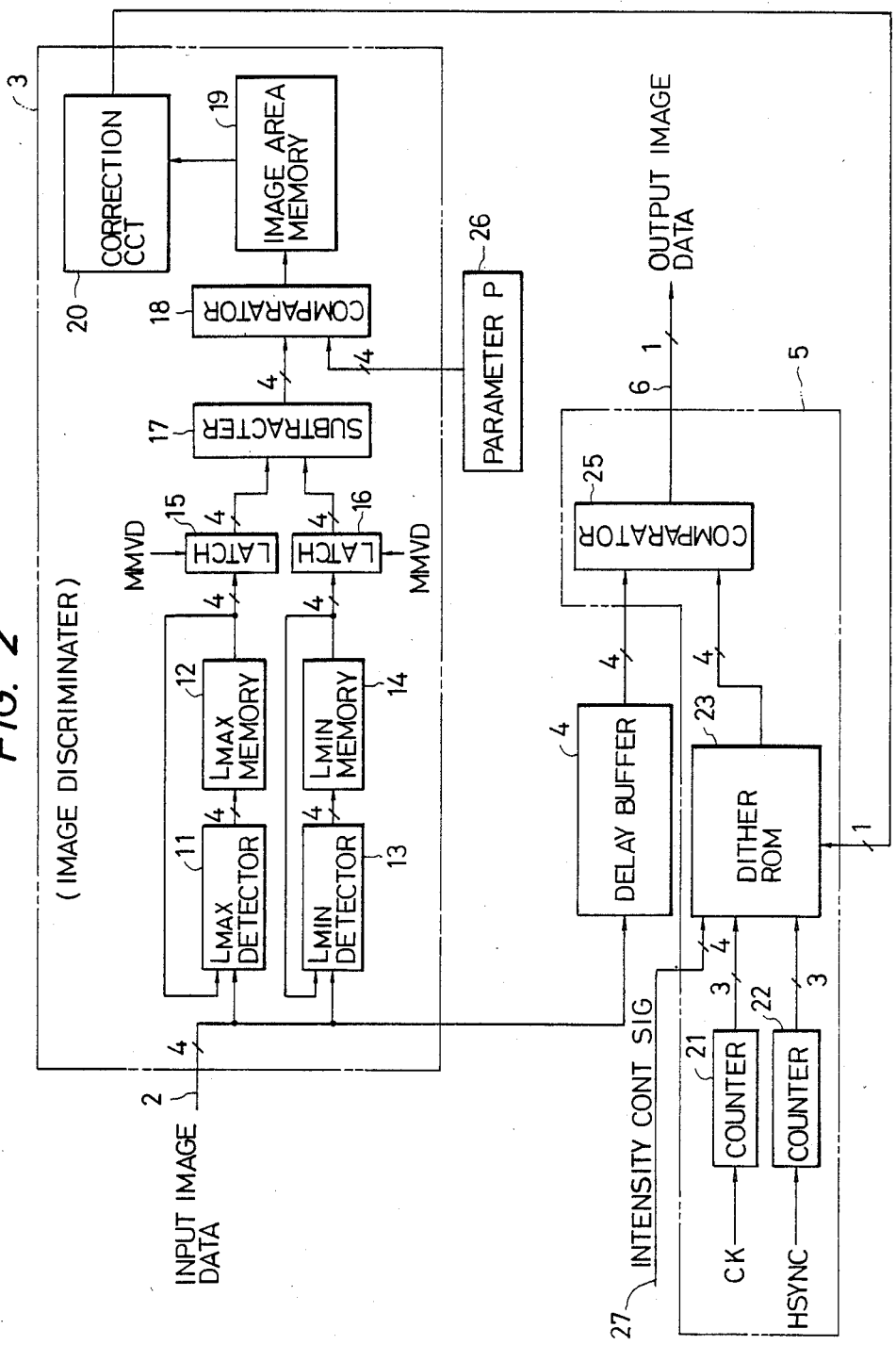
FIG. 2 shows details of an image discriminator 3, a buffer 4 and a dither/binarizer 5 shown in FIG. 1.

In FIG. 2, numeral 2 denotes the image data signal which is a 4-bit parallel signal and sequentially applied to the buffer 4 and the image discriminator 3. Numeral 11 denotes an Lmax detector, and numeral 12 denotes an Lmax memory which stores density level information for each of the 4-bit groups corresponding in number to a quotient of the number of pixels in one main scan line divided by four. The output of the Lmax memory 12 is fed back to an input terminal of the Lmax detector 11 to allow the comparison of the Lmax in the corresponding block in the previous main scan line with the pixel density in the current main scan line. The output of the Lmax memory 12 is also supplied to a subtractor 17 through a latch 15. Numeral 13 denotes an Lmin detector and numeral 14 denoted an Lmin memory. Those are of similar construction to the detector 11 and the memory 12, respectively. The output of the Lmin memory 14 is supplied to the subtractor 17 through a latch 16. The subtractor 17 carries out a subtraction (Lmax−Lmin) and the difference is compared with the image discrimination parameter P by a comparator 18, and the image discrimination output "0" or "1" is stored in an image area memory 19. Thus, the image area memory 19 contains the image discrimination outputs "0" or "1" for the respective blocks to determine the processing methods for the respective blocks. A correction circuit 20 corrects the output of the image area memory 19 and supplies the corrected output to a dither ROM 23. The image discriminator 3 has thus been described.

In FIG. 2, numerals 21 and 22 denote counters to which a basic clock CK for each pixel and a main scan line synchronizing signal HSYNC are applied, respectively, and generate an address of the dither ROM 23. The signal HSYNC is synchronized with a horizontal synchronizing signal BD of a laser beam printer. The output of the correction circuit 20 and a density adjustment signal 27 are also supplied to the dither ROM 23 as addresses. The dither ROM 23 produces a threshold for the binarization when the image discrimination output from the correction circuit 20 is "1", and produces 16-level thresholds represented by a 4×4 matrix for the dither processing when the image discrimination output is "0". The output of the dither ROM 23 defines the threshold to the respective pixels. It is compared with the output of the buffer 4 (original image data) by the comparator 25 to produce the output image data 6 ("1" and "0" dot data). The buffer 4 and the dither/binarizer 5 have thus been explained.

The operation of FIG. 2 is explained with reference to a time chart of FIG. 3.

In FIG. 2, the image data 2 is inputted one line (main scan line) at a time in synchronism with the main scan line synchronizing signal HSYNC. The pixels (image data) in one line are 4-bit parallel (16-level) data synchronized with the basic clock CK. The synchronizing signal HSYNC clears counters, not shown, which generate timing signals HMINT, IBDEC and MMVD shown in FIG. 3.

When the image data 2 of the first line is inputted, the first pixels of the respective image areas (blocks) are forcibly stored in the Lmax memory 12 and the Lmin memory 14 at the timing of the signal MMINT (one pixel for each four-pixel block).

If a pixel data is inputted at a timing other than that of the signal MMINT in the processing of the first line, that pixel data is compared with a tentative Lmax or Lmin stored in the Lmax memory 12 or the Lmin memory 14 by the Lmax detector 11 and the Lmin detector 13 at a timing of Lmax/Lmin detection in FIG. 3, and the Lmax memory 12 is updated by a higher density pixel data and the Lmin memory 14 is updated by a lower density pixel data. In this manner, a maximum pixel density and a minimum pixel density for each 3-pixel block are stored in the Lmax memory 12 and the Lmin memory 14, and the detection processing for the first line is terminated. For example, when an original document of a size B4 is read at a density of 16 pixels 1 mm, 4096 pixels exist in one line, and 1024 4×4-pixel blocks exist in every four lines. Accordingly, the memories 12 and 14 may be 1024×4-bits RAM's respectively.

The image data signal 2 in the second line is next processed. The timing of MMINT used in the first line does not exist and the densities of the respective blocks are sequentially compared. At the end of the processing of the second line, the maximum density and the minimum density of the two lines (eight pixels) for each block are stored in the RAM's. Similarly, at the end of the processing of the fourth line, the maximum density and the minimum density of the 1024 image areas are stored in the Lmax memory 12 and the Lmin memory 14. In the processing of the fourth line, the maximum/minimum densities for each block (image area) are determined at the timing of the signal MMVD of FIG. 3. The densities are latched in the latches 15 and 16 at that timing and the difference (Lmax−Lmin) is calculated by the subtractor 17 and compared with the image discrimination parameter P by the comparator 18, and "1" or "0" is stored in the image area memory 19 at the timing of IBDEC.

In this manner, the data is written into the image area memory 19 simultaneously with the processing of the fourth line image data signal.

The image data signal from the fifth line is similarly processed for every four lines, and the image discrimination data is written into the image area memory 19.

The image area memory 19 is read out from the fifth line by an image area read clock which is generated at every fourth basic clock CK, and the same data are repeatedly read from the sixth and seventh lines. For the eight line, the image area memory 19 is sequentially read and written as shown in a RAM operation timing chart of FIG. 4 so that the same data as those from the fifth to seventh lines are read while a new image area data is written.

The data read from the image area memory are corrected by the correction circuit 20 to improve an image quality and they are supplied to the address terminal of the dither ROM 23 to generate the threshold pattern together with the output of the counters 21 and 22.

The density adjustment signal 27 is a control signal to adjust the dither threshold to improve the quality of the recorded image, and it is supplied from an operation panel through a controller (not shown).

The dither ROM 23 is programmed to generate the threshold pattern in accordance with the image discrimination output from the correction circuit 20. When the output of the correction circuit 20 is "0", the dither ROM 23 generates a predetermined dither pattern, and when the output of the correction circuit 20 is "1", it generates a threshold pattern which results in that all of the thresholds in the image area are "7" (binarization). The original image data delayed by four-line period is compared with the threshold, for each pixel, by the comparator 25 to produce the output image data 6.

While the dither/binarizer is used in the present embodiment, any other means which can process the image in accordance with the image discrimination output may be used. Specifically, when the multi-value image area is discriminated, the image data 6 may be outputted such that a dot size is changed to improve the tonality of the half-tone output. In the dither processing of the present embodiment, each pixel of the input image data is compared with each threshold of the dither matrix to produce one-bit output image data. Alternatively, a dither processing in which each pixel of the input data is compared with a plurality of thresholds of the dither matrix may be used. While the comparator 25 and the dither ROM 23 are used in the dither processing of the present embodiment, a memory for addressing the input image data may be used. The binarizing processing may also uses a memory or may be done in other manner.

While a monochromatic image processing is explained in the above embodiment, the present invention is also applicable to a color dither processing.

In the present embodiment, the maximum density and the minimum density of the image data are stored for each block and the difference therebetween is calculated to determine the image discrimination output. Alternatively, a maximum density of the image data for each block may be stored and a difference from a predetermined value may be calculated to determine the image discrimination output. Alternatively, approximations of the maximum density and the minimum density of the image data for each block may be stored.

Figure 5:
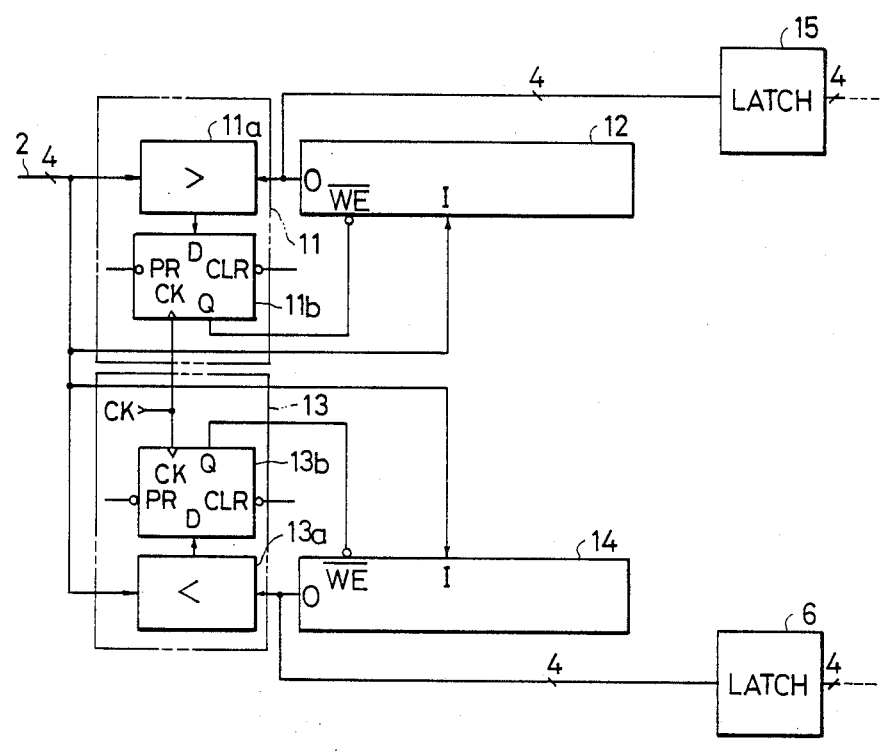
FIG. 5 shows details of an Lmax detector 11, an Lmax memory 12, an Lmin detector 13 and an Lmin memory 14.

FIG. 5 shows details of the Lmax detector 11, the Lmax memory 12, the Lmin detector 13 and the Lmin memory 14.

Numerals 11a and 13a denote comparators and numerals 11b and 13b denote flip-flop (F/F).

As described above, the RAM 12, the comparator 11a and the F/F 11b divide the sequentially read image data (4-bit) 2 into $4 \times 4$-pixel blocks and detect the maximum pixel density Lmax of each block.

The detection of Lmax is explained with reference to FIGS. 6 and 7.

FIG. 6 shows an array of the image densities read by a solid-state image pickup device such as a CCD and converted to a digital signal by an A/D converter, not shown.

FIG. 7 shows memory areas of the Lmax memory 12. As shown in FIG. 7 (A), the Lmax memory 12 may be a memory having a memory space for storing data derived by dividing the image read at a density of 16 pixels/mm in the main-scan direction into four-pixel areas, that is, data corresponding to the image areas A0 - A1023 (for an original document having a length of 256 mm in the main-scan direction).

In FIG. 6, arrows H and V indicate the main scan direction and the sub-scan direction of the original document, respectively, and A0, A1, . . . denote $4 \times 4$ (=16)-pixel blocks.

Let us assume that when the CCD main-scans the (4n+1)th line, the image data 2

$$3 \rightarrow 7 \rightarrow 10 \rightarrow 10 \rightarrow 8 \rightarrow 9 \rightarrow \ldots$$

are sequentially supplied to the comparator 11a and the Lmax memory 12 in synchronism with the scan clock CK. The comparator 11a sequentially compares the sequentially supplied image data with the data stored in the Lmax memory 12, and if the supplied data has a higher density, the output of the comparator 11a is held by the F/F 11b and the Lmax memory 12 is set in a write mode.

When a first data of the (4n+1)th line is supplied to the comparator 11a, it is unconditionally stored in the Lmax memory 12 as an initial value in the memory area to which the data belongs. Thus, in FIG. 6, the density data "3" is set as the initial value for the image area A0, and the data "8" is set as the initial value for the image area A1.

In the image area A0, when the next data "7" in the (4n+1)th line is supplied to the comparator 11a, the initial value "3" stored in the Lmax memory 12 is read and they are compared. Since "7">"3", the content of the Lmax memory 12 is changed from "3" to "7".

Similarly, when the next data "10" is supplied, the content of the Lmax 12 is again updated. At the end of the transfer of the 4-pixel data of the image area A0 in the (4n+1)th line, the maximum value "10" of the four pixels is stored at an address of the Lmax memory 12 corresponding to the image area A0, as shown in FIG. 7(B).

Similarly, at the end of the scan of the image area A1 in the (4n+1)th line, the maximum value "9" is stored. This processing is repeated 1024 times for each of the image areas in the (4n+1)th line, and at the end of the scan, 1024 data are stored at the respective addresses of the Lmax memory 12 as the maximum values Lmax of the respective image areas in the (4n+1)th line.

In the scan of the (4n+2)th line, the image data are sequentially compared with the maximum value of the corresponding image areas in the (4n+1)th line. Thus, at the end of the processing for the (4n+2)th line, the data "10" is stored as the maximum value in the area of the Lmax memory 12 corresponding to the image area A0, as shown in FIG. 7(C).

Similarly, at the ends of the processings of the (4n+3)th line and the (4n+4)th line, the data "15" and the data "15" are stores as shown in FIGS. 7(D) and 7(E), respectively.

In the processing of the {4(n+1)+1}th line, the data "15", that is, the maximum value Lmax in the image area A0 is read out of the Lmax memory 12 before the initial value "12" is written into the Lmax memory 12, and it is supplied to the subtractor 17 through the latch 4.

The Lmin memory 14, the comparator 13a and the F/F 13b detect the minimum pixel density Lmin of the image area in the same manner as the Lmax memory 12, the comparator 11a and the F/F 11b detect the maximum value Lmax.

FIG. 8 shows a sectional view of the reader 1 and the printer 9 shown in FIG. 1. The original document is placed facing down on a document glass 33, and a reference position of placement is at a left inside as viewed from the front. The original document is pressed onto the document glass by a document cover 34. The original document is illuminated by a fluoresent lamp 32 and a light reflected therefrom is condensed onto a CCD 31 through mirrors 35 and 37 and a lens 36. The mirror 37 is moved at a velocity which is two times as high as that of the mirror 35. The optical unit is moved by a DC servo motor with PLL at a constant speed from left to right. The speed is 180 mm/sec in a forward run in which the document is illuminated and 468 mm/sec in a return run.

The printer 9 located below the reader 1 in FIG. 8 is now explained. The bit-seriarized image signal 6 processed by the dither/binarizer 5 is supplied to a laser scan optical unit 55 of the printer. This unit comprises a semiconductor laser, a collimating lens, a rotary polygon mirror, an F-Q lens and a correction optical system. The image signal from the reader is supplied to the semiconductor laser which converts it to a light signal. The laser beam is collimated by the collimating lens and it is impinged to the polygon mirror which is rotating at a high speed so that a photosensitive drum 38 is scanned by the laser beam. The rotation speed of the polygon mirror is 2600 rpm.

The laser beam for the unit is impinged to the photosensitive drum 38 through a mirror 54.

The photosensitive drum 38 may include a conductive layer, a photosensitive layer and an insulative layer. Process components for forming an image on the photosensitive drum are arranged. Numeral 39 denotes a pre-discharger lamp, numeral 40 denotes a pre-discharging lamp, numeral 41 denotes a primary charger, numeral 42 denotes a secondary charger, numeral 43 denotes a flat exposure lamp, numeral 44 denotes a developer, numeral 45 denotes a paper feed cassette, numeral 46 denotes a paper feed roller, numeral 47 denotes a paper feed guide, numeral 48 denotes a registration roller, numeral 49 denotes a transfer charger, numeral 50 denotes a separation roller, numeral 51 denotes a convey guide, numeral 52 denotes a fixer and numeral 53 denotes a tray.

The operations of those process components are well known and the explanation thereof is omitted.

As described hereinabove, according to the present invention, the image data is received from the reader and buffered, and the maximum and minimum values of the image data for each block are sequentially detected and updated. Therefore, at the end of the reading of the lines of the block, the maximum and minimum values of the block are determined. Thus, a high speed and real-time image discrimination processing is attained.

Further, in accordance with the present invention, the maximum and minimum values of the pixel densities for each block, which are necessary to discriminate the image, are parallely detected by different detectors and stored in different memories. Therefore, high speed and real-time image discrimination processing is attained.

In accordance with the present invention, the shift of the processing time of the image discriminator is compensated by the line buffer of as much as fourline capacity. Thus, the dither processing or the binarizing processing is attained on real-time for the image data input and high speed image processing is attained.

In accordance with the present invention, an original document which contains a binary image such as characters and a half tone image such as a photograph can be reproduced at a high quality.

The present invention is not limited to the illustrated embodiments but many other variations can be practiced within the scope of the claims.

What we claim is:

1. An image processing apparatus comprising:
   input means for inputting pixel data;
   discrimination means for discriminating whether the pixel data inputted by said input means represents a half-tone image or non-half-tone image for each of a plurality of blocks, each said block having a plurality of pixel data arranged in two dimensions;
   buffer means for delaying the pixel data inputted by said input means; and
   process means for processing the pixel data outputted from said buffer means for each said block, in accordance with the result of the discrimination performed by said discrimination means,
   wherein said discrimination means performs the discrimination operation thereof in synchronism with input of the pixel data into said buffer means, and
   wherein said discrimination means sequentially receives the pixel data, for each line, and determines whether said block represents half-tone or non-half-tone in synchronism with input of the pixel data corresponding to the last line of the block.

2. An image processing apparatus according to claim 1, wherein said discrimination means includes memory means for storing a predetermined value for each said block and discriminates whether said block represents a half-tone image or a non-half-tone image on a basis of the predetermined value.

3. An image processing apparatus according to claim 2, wherein said discrimination means includes setting means for comparing sequentially inputted pixel data of said block with the predetermined value relating to said block to set a new predetermined value and store the new predetermined value in said memory means in accordance with the comparison result.

4. An image processing apparatus according to claim 2, wherein the predetermined value is a maximum value or a minimum value of the pixel data in said block.

5. An image processing apparatus according to claim 4, wherein said memory means includes a first memory means and a second memory means for storing the maximum and minimum respectively, and wherein said discrimination means includes operating means for performing an operation on the maximum value and the minimum value and discriminates whether said block represents a half-tone image or a non-half-tone image in accordance with the result of the operation by said operation means.

6. An image processing aparatus according to claim 5, wherein said buffer means delays the pixel data inputted by said input means, corespondingly to the discriminating operation by said discrimination means.

7. An image processing apparatus according to claim 6, wherein said process means comprises dither process means for performing dither conversion of the pixel data by utilizing a predetermined threshold matrix and binarizing means for binarizing the pixel data by utilizing a fixed threshold, and selects one of said dither process means and said binarizing means in accordance with the result of the discrimination performed by said discrimination means.

8. An image processing apparatus comprising:
input means for inputting pixel data;
first memory means and second memory means for storing first and second predetermined values for each of a plurality of blocks, respectively, each said block having a plurality of pixel data;
selection means for selecting a processing manner for the pixel data in accordance with the first and second predetermined values stored in said first and second memory means;
buffer means for delaying the pixel data inputted by said input means; and
process means for processing the pixel data outputted from said buffer means in the manner determined by the output of said selection means;
said first and second memory means performing the storage operation thereof in synchronism with input of said first and second predetermined values into said buffer means, respectively; and
setting means for parallelly comparing sequentially inputted pixel data of each said block with said first and second predetermined values relating to said block to set new first and second predetermined values and storing the new first and second predetermined values in said first and second memory means, respectively in accordance with the comparison result.

9. An image processing apparatus according to claim 8, wherein said selection means includes parameter setting means for setting a parameter for selecting the process manner based on said first and second predetermined values and storing said parameter.

10. An image processing apparatus according to claim 8, wherein said first and second memory means store maximum and minimum values, respectively, of the pixel data of each said block.

11. An image processing apparatus according to claim 8, wherein said process means comprises dither process means for performing dither conversion of the pixel data by utilizing a predetermined threshold matrix and binarizing means for binarizing the pixel data by utilizing a fixed threshold, and selects one of said dither process means and said binarizing means in accordance with the output from said selection means.

12. An image processing apparatus according to claim 8, wherein said selection means discriminates whether the pixel data inputted by said input means represents a half-tone image or a non-half-tone image for each of said blocks on the basis of said first and second predetermined values, and said process means proceses the pixel data outputted from said buffer means for each block, in accordance with the output from said selection means.

13. An image processing apparatus comprising:
document read means for reading a document to produce pixel data;
discrimination means for discriminating half-tone and non-half-tone for each of a plurality of blocks arranged in main-scan direction of said document read means, each said lock having a plurality of pixel data arranged in two dimensions;
said discrimination means sequentially receiving the pixel data, for each line, from said document read means and determining whether said block represents half-tone or non-half-tone in synchronism with input of the pixel data corresponding to the last line of the block; and
output means for processiong the pixel data from said document read means in accordance with the discrimination result by said discrimination means and outputting an image signal.

14. An image processing apparatus according to claim 13, wherein said output means includes buffer means for delaying the pixel data supplied from said document read means and process means for processing the pixel data outputted from said buffer means in accordance with the result of the discrimination performed by said discrimination means.

15. An image processing apparatus according to claim 14, wherein said discrimination means includes memory means for storing a predetermined value for each block, and discriminates whether said block represents a half-tone image or a non-half-tone image on the basis of the predetermined value.

16. An image processing apparatus according to claim 15, wherein said discrimination means includes setting means for comparing the sequentially inputted pixel data of said block with the predetermined value relating to said block to set a new predetermined value and store the new predetermined value in said memory means in accordance with the comparison result.

17. An image processing apparatus according to claim 16, wherein the predetermined value is a maximum value or a minimum value of the pixel data in said block.

18. An image processing apparatus according to claim 14, wherein said buffer means delays the pixel data correspondingly to discrimination operation by said discrimination.

19. An image processing apparatus according to claim 18, wherein said process means comprises dither process means for performing dither conversion of the pixel data by utilizing a predetermined threshold matrix and binarizing means for binarizing the pixel data by utilizing a fixed threshold, and selects one of said dither process means and said binarizing means in accordance with the result of said discrimination means.

20. An image processing apparatus comprising: a document to
document read means for reading produce pixel data;
discrimination means for discriminating half-tone and non-half-tone for each of a plurality of blocks arranged in a main-scan direction of said document read means, each said block having a plurality of pixel data; and
output means for processing the pixel data from said document read means in accordance with the output of said discrimination means and outputting an image signal before an end of document scan by said document read means, wherein said output means includes buffer means for delaying the pixel data supplied from said document read means and process means for processing the pixel data outputted from said buffer means in accordance with the result of said discrimination means, wherein said discrimination means includes memory means for storing a predetermined value for each block, and discriminates whether said block represents a half-tone image or a non-half-tone image on the basis of the predetermined value, and wherein said discrimination means includes setting means for comparing sequentially inputted pixel data of said block with the predetermined value relating to said block to set a new predetermined value and store the new predetermined value in said memory means in accordance with the comparison result.

21. An image processing apparatus according to claim 20, wherein said discrimination means discriminates whether the pixel data inputted by said input means represents a half-tone image or a non-half-tone image for each of said blocks, and said process means processes the pixel data outputted from said buffer means for each block, in accordance with the result of said discrimination means.

22. An image processing apparatus according to claim 20, wherein the predetermined value is a maximum value or a minimum value of the pixel data in said block.

23. An image processing apparatus according to claim 20, wherein said buffer means delays the pixel data correspondingly to discrimination operation by said discrimination.

24. An image processing apparatus according to claim 23, wherein said process means comprises dither process means for performing dither conversion of the pixel data by utilizing a predetermined threshold matrix and binarizing means for binarizing the pixel data by utilizing a fixed threshold, and selects one of said dither process means and said binarizing means in accordance with the result of said discrimintion means.

25. An image processing apparatus comprising:
input means for inputting pixel data;
discrimination means for discriminating whether he pixel data inputted by said input means represents a half-tone image or a non-half-tone image on a basis of a predetermined value of the pixel data in one of a plurality of blocks, said block having a plurality of pixel data;
buffer means for delaying the pixel data inputted by said input means; and
process means for processing a pixel data outputted from said buffer means in accordance with the result of the discrimination performed by said discrimination means;
said discrimination means including memory means for storing the predetermined value of the pixel data in the lock and setting means for comparing sequentially inputted pixel data of said block with the predetermined value relating to said block to set a new predetermined value and store the new predetermined value in said memory means in accordance with the comparison result;
said discrimination means discriminating the pixel data in synchronism with input of the pixel data into said buffer means.

26. An image processing apparatus according to claim 25, wherein said memory means includes a first memory and a second memory for storing a first predetermined value and a second predetermined value of the pixel data in said block, respectively.

27. An image processing apparatus according to claim 26, wherein said discrimination means includes parameter setting means for setting a parameter on the basis of the first and second predetermined values stored in said first and second memories and for storing the parameter, said parameter determining a processing manner of said process means.

28. An image processing apparatus according to claim 27, wherein said process means comprises dither process means for performing dither conversion of the pixel data by utilizing a predetermined threshold matrix and binarizing means for binarizing the pixel data by utilizing a fixed threshold, and selects one of said dither process means and said binarizing means in accordance with the parameter.

29. An image processing apparatus according to claim 26, wherein said first and second memories store a maximum value and a minimum value of the pixel data in said block, respectively.

* * * * *

UNITED STATES PATENT AND TRADEMARK OFFICE
CERTIFICATE OF CORRECTION

PATENT NO. : 4,786,976

DATED : November 22, 1988

INVENTOR(S) : MITSUJI TAKAO, ET AL.

Page 1 of 4

It is certified that error appears in the above-identified patent and that said Letters Patent is hereby corrected as shown below:

AT [56] IN REFERENCES CITED

U.S. Patent Documents, "Matsumawa et al." should read --Matsunawa et al.--.

AT [56] IN REFERENCES CITED

Other Publications, "Offenlegunsschrift" should read --Offenlegungsschrift--.

IN THE DRAWINGS

Sheet 1, Figure 1, "IMAGE DISCRIMINATER" should read --IMAGE DISCRIMINATOR--.
Sheet 2, Figure 2, "(IMAGE DISCRIMINATER)" should read --(IMAGE DISCRIMINATOR).

COLUMN 1

Line 27, "is to" should read --into--.
Line 41, "or bar" should read --or a bar--.
Line 58, "image" should read --image,--.

COLUMN 2

Line 48, "to" (second occurrence) should read --into--.
Line 50, "denoted" should read --denotes--.

UNITED STATES PATENT AND TRADEMARK OFFICE
CERTIFICATE OF CORRECTION

PATENT NO. : 4,786,976
DATED : November 22, 1988
INVENTOR(S) : MITSUJI TAKAO, ET AL.

It is certified that error appears in the above-identified patent and that said Letters Patent is hereby corrected as shown below:

COLUMN 3

Line 18, "dither/binarizer" should read --dither/binarizer 5--.
    Line 19, "image discriminator" should read --image discriminator 3--.
    Line 21, "ditherd" should read --dithered--.
    Line 31, "shwn" should read --shown--.
    Line 47, "subtractor 17" should read --subtracter 17--.
    Line 48, "denoted" should read --denotes--.
    Line 51, "subractor 17" should read --subtracter 17--.
    Line 52, "subractor 17" should read --subtracter 17--.

COLUMN 4

Line 23, "HMINT," should read --MMINT,--.
    Line 62, "subtractor 17" should read --subtracter 17--.

COLUMN 5

Line 8, "eight" should read --eighth--.
    Line 49, "uses" should read --use--.
    Line 50, "other" should read --another--.
    Line 68, "flip-flop (F/F)." should read --flip-flops (F/F).--.

COLUMN 6

Line 48, "Lmax 12" should read --Lmax memory 12--.

UNITED STATES PATENT AND TRADEMARK OFFICE
CERTIFICATE OF CORRECTION

PATENT NO. : 4,786,976

DATED : November 22, 1988

INVENTOR(S) : MITSUJI TAKAO, ET AL.

Page 3 of 4

It is certified that error appears in the above-identified patent and that said Letters Patent is hereby corrected as shown below:

COLUMN 7

Line 3, "stores" should read --stored--.
    Line 9, "subtractor 17" should read --subtracter 17--.
    Line 10, "4." should read --15.--.
    Line 22, "fluoresent lamp 32" should read --fluorescent lamp 32--.
    Line 32, "bit-seriarized" should read --bit-serialized--.

COLUMN 8

Line 3, "Further,in" should read --Further, in--.
    Line 6, "parallely" should read --parallelly--.
    Line 11, "fourline" should read --four-line--.
    Line 17, "half tone" should read --half-tone--.
    Line 27, "or non-half-tone" should read --or a non-half-tone--.
    Line 64, "imum and minimum" should read --imum value and minimum value--.

COLUMN 9

Line 2, "operation means." should read --operating means.--.
    Line 3, "aparatus" should read --apparatus--.
    Line 5, "corespondingly" should read --correspondingly--.
    Line 41, "respectively" should read --respectively,--.

UNITED STATES PATENT AND TRADEMARK OFFICE
CERTIFICATE OF CORRECTION

PATENT NO. : 4,786,976
DATED : November 22, 1988
INVENTOR(S) : MITSUJI TAKAO, ET AL.                    Page 4 of 4

It is certified that error appears in the above-identified patent and that said Letters Patent is hereby corrected as shown below:

COLUMN 10

Line 6, "in main-scan" should read --in a main-scan--.
Line 7, "lock" should read --block--.
Line 15, "processiong" should read --processing--.
Line 47, "discrimination." should read --discrimination means.--.
Line 56, "a" should be deleted.
Line 57, "document to" should be deleted.
Line 58, "reading produce" should read --reading a document to produce--.

COLUMN 11

Line 34, "discrimination." should read --discrimination means.--.
Line 42, "discrimintion" should read --discrimination--.
Line 45, "he" should read --the--.

COLUMN 12

Line 13, "lock" should read --block--.

Signed and Sealed this

Thirteenth Day of June, 1989

Attest:

DONALD J. QUIGG

Attesting Officer      Commissioner of Patents and Trademarks